US008888405B2

(12) United States Patent
Kreutz et al.

(10) Patent No.: US 8,888,405 B2
(45) Date of Patent: Nov. 18, 2014

(54) ROAD ROLLER

(71) Applicant: BOMAG GmbH, Boppard (DE)

(72) Inventors: Tobias Kreutz, Ellern (DE); Jens Wagner, Boppard (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 13/961,106

(22) Filed: Aug. 7, 2013

(65) Prior Publication Data

US 2014/0044483 A1 Feb. 13, 2014

(30) Foreign Application Priority Data

Aug. 13, 2012 (DE) .......................... 10 2012 016 034
Jan. 21, 2013 (DE) .......................... 10 2013 000 953

(51) Int. Cl.
*E01C 19/23* (2006.01)
*B62D 21/18* (2006.01)
*B62D 21/06* (2006.01)
*E01C 19/26* (2006.01)
*B62D 53/02* (2006.01)

(52) U.S. Cl.
CPC ................ *E01C 19/26* (2013.01); *B62D 21/06* (2013.01); *B62D 21/186* (2013.01); *E01C 19/23* (2013.01); *B62D 53/02* (2013.01)
USPC .......................................... 404/126; 280/400

(58) Field of Classification Search
USPC .......... 404/122, 126; 180/9.46; 280/400, 442; D15/20
IPC ............. E01C 19/23; B62D 21/00,21/18, 12/00
See application file for complete search history.

(56) References Cited

U.S. PATENT DOCUMENTS

| 2,701,616 | A | * | 2/1955 | Cooper ......................... 180/19.2 |
| 4,260,280 | A | | 4/1981 | Hirn et al. |
| 4,424,878 | A | * | 1/1984 | van der Lely ................. 180/235 |
| 5,664,909 | A | * | 9/1997 | Lindgren et al. .............. 404/122 |
| 6,345,932 | B1 | * | 2/2002 | Fix ................................. 404/126 |
| 7,004,275 | B1 | * | 2/2006 | Junga et al. ................ 180/89.13 |
| 2012/0045281 | A1 | | 2/2012 | Wagner |

FOREIGN PATENT DOCUMENTS

| AT | 363120 B | 7/1981 |
| BE | 521509 A | 7/1953 |
| CH | 115836 A | 7/1926 |
| DE | 1755728 A1 | 12/1971 |
| DE | 4202298 A1 | 7/1993 |

(Continued)

OTHER PUBLICATIONS

English Machine Translation of Claim 1 of German Application No. DE 1 755 728 A1, published on Dec. 23, 1971 (1 page).

(Continued)

*Primary Examiner* — Gary Hartmann
(74) *Attorney, Agent, or Firm* — Wood, Herron & Evans, LLP

(57) ABSTRACT

A road roller is described comprising a front carriage and a rear carriage, which are interconnected by an articulated swivel joint, wherein the front carriage and the rear carriage each comprise a front carriage frame and a rear carriage frame. The front carriage frame and/or the rear carriage frame consist of beams including a main beam, which extends horizontally along the longitudinal median plane of the road roller and at one end of which the articulated swivel joint is disposed, and comprises two side beams diverging from the free end of the main beam to form a "V". Disposed thereon are the supports for supporting the drums, wherein the side beams are upwardly oriented.

12 Claims, 5 Drawing Sheets

(56) References Cited

FOREIGN PATENT DOCUMENTS

| | | |
|---|---|---|
| EP | 2 423 076 A1 | 2/2012 |
| GB | 122189 A | 10/1919 |
| GB | 744546 A | 2/1956 |
| JP | S58-160880 U | 10/1983 |

OTHER PUBLICATIONS

English Machine Translation of Abstract of German Application No. DE 42 02 298 C2, published on Jul. 29, 1993 (1 page).

German Patent Office, Search Report, German Application No. 10 2012 016 034.8, mailed on Mar. 5, 2013 (5 pages).

European Patent Office, Search Report, Application No. 13003228.7, mailed Sep. 11, 2014 (4 pages).

Espacenet, English Machine Translation of EP2423076A1, published Feb. 29, 2012, retrieved from http://worldwide.espacenet.com on Sep. 26, 2014 (9 pages).

* cited by examiner

ROAD ROLLER

CROSS-REFERENCE TO RELATED APPLICATIONS

The present application claims priority under 35 U.S.C. §119 of German Patent Application No. 10 2012 016 034.8, filed Aug. 13, 2012 and German Patent Application No. 10 2013 000 953.7, filed Jan. 21, 2013, the disclosure of which is hereby incorporated herein by reference in its entirety.

FIELD OF THE INVENTION

The present invention relates to a road roller comprising a front carriage and a rear carriage, which are interconnected by an articulated swivel joint, wherein the front carriage and the rear carriage have a front carriage frame and a rear carriage frame.

BACKGROUND OF THE INVENTION

Such road rollers are employed for the purpose of road construction and are known in the prior art. The front carriage and the rear carriage each have a supporting frame consisting mainly of outer load-bearing and supporting elements, between which are disposed functional components such as drive motors, auxiliary drives, tanks, and the like.

SUMMARY OF THE INVENTION

The object of the present invention is to provide a road roller of the aforementioned type in which a cost-effective and sturdy construction of the front carriage frame and the rear carriage frame is made possible.

This object is achieved in that the front carriage frame and/or the rear carriage frame each consist of beams, with a main beam extending horizontally in the longitudinal median plane of the road roller and with the articulated swivel joint disposed at one end thereof, and comprising two upwardly oriented side beams diverging from the free end of the main beam to form a "V" in mirror-inverted relationship about the longitudinal median plane, wherein said side beams are adapted to freely overhang the free end of the main beam and freely overhanging load-bearing supports are disposed at the free ends of the side beams in a direction parallel to the main beam, on each of which load-bearing supports a drum is disposed.

The advantage gained by the present invention is that the structure of the front carriage frame and/or that of the rear carriage frame make it possible, because of their Y shape, to achieve a particularly efficient flow of forces from the articulated connection directly to the connections for the supports, and that a savings in weight can thus be achieved over prior body frameworks. This body framework enables the driver's field of view from the driver's cab towards the drums and the road surface below the driver's cab to be increased, since the body framework of the road roller can be inwardly offset in the region beneath the driver's cab to the side thereof.

In order to stabilize the body framework, it is advantageous when the free ends of a pair of side beams are interconnected by a connecting piece.

The connecting piece between the side beams of a side beam pair and/or between the supports for supporting the driver's cab is very simply in the form of a stiffener and is made of a reinforcing metal plate, which is inserted in the interspace between the side beams of a side beam pair.

The driver's cab can be readily mounted on the front carriage frame by the provision of supporting beams adapted to support a driver's cab, wherein said supporting beams are oriented upwardly and are mounted on the end of the main beam of the front carriage near to the articulated swivel joint in the form of a "V" and in mirror-inverted relationship about the longitudinal median plane.

Furthermore, it is advantageous when vertical supports for supporting the driver's cab are disposed on the side beams of the front carriage.

Additional stability can be applied to the front carriage frame when a cross strut is positioned between the free ends of the side beams and/or between the free ends of the supports.

With respect to the stiffness of the front carriage frame, it is advantageous when the reinforcing metal plate is part of the respective cross strut (39, 40) between the free ends of the side beams and/or those of the supports.

A very great savings in weight is achieved when the main beam, the side beams, and/or the driver's cab supports are in the form of a profile configured as a hollow profile and/or a T profile and/or a U profile.

The integration of the reinforcing metal plate and the side beams and/or the supporting beams is achieved in a simple manner by configuring the free limb of each reinforcing metal plate so as to merge with an edge having an L profile in such a way that these edges form the first and second cross struts respectively.

An advantageous development of the present invention consists in that a water tank is disposed in the space above the main beam of the front carriage as well as between the associated supports for supporting the driver's cab and the side beams. This has the advantage that the weight of a filled tank can be directly absorbed by the main beam.

It is also advantageous when a fuel tank is disposed in the space between the free ends of the side beams of the front carriage.

BRIEF DESCRIPTION OF THE DRAWINGS

The present invention will be described in greater detail below with reference to an exemplary embodiment illustrated in the diagrammatic drawings, in which.

DETAILED DESCRIPTION OF THE INVENTION

Figure 1:
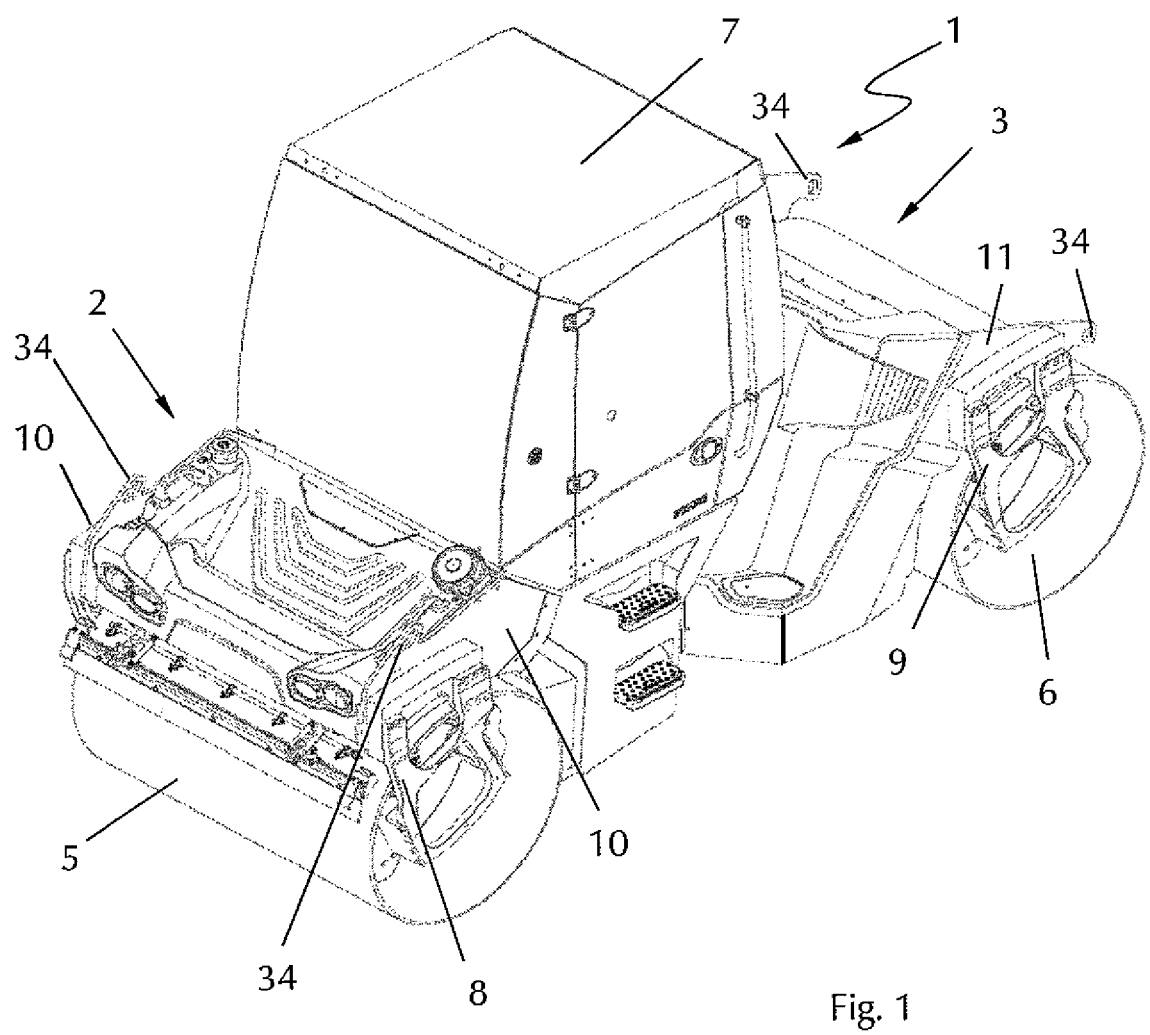
FIG. 1 is a perspective view of a road roller.
Figure 2:
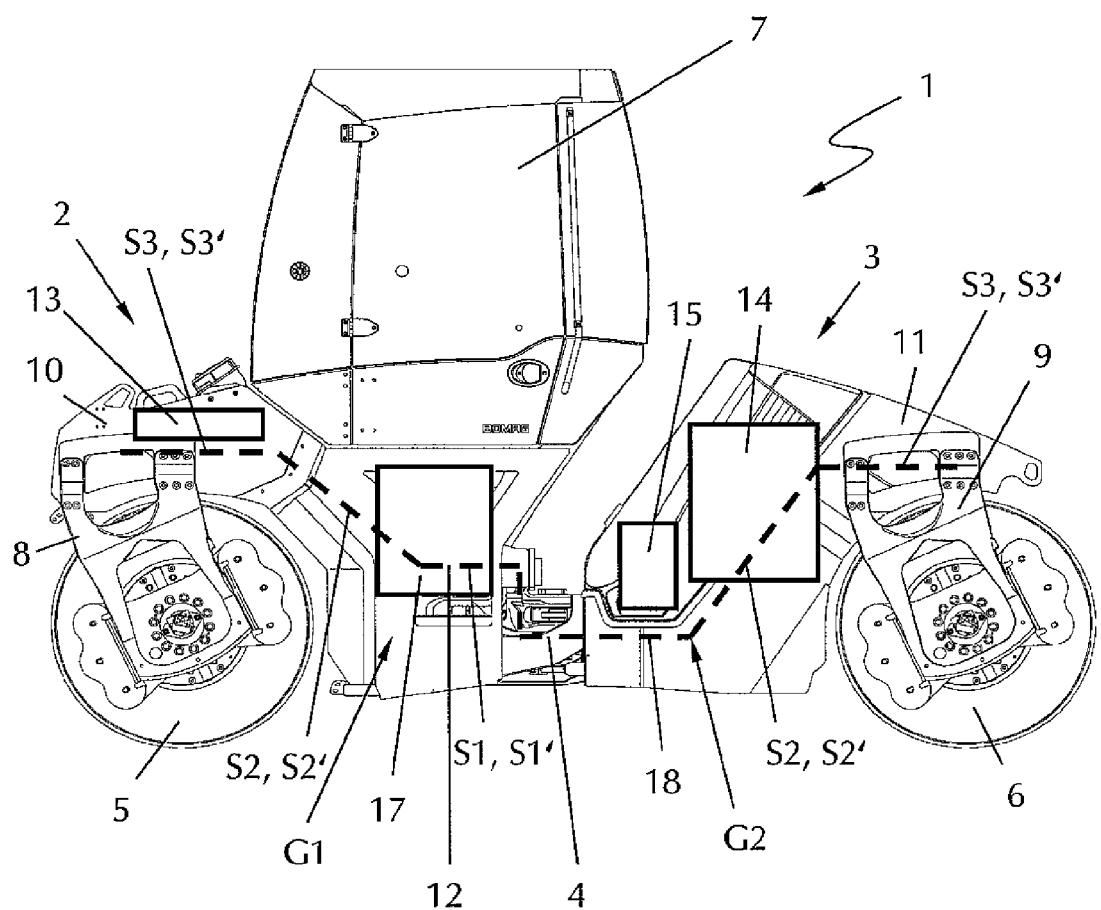
FIG. 2 is a partial cross-sectional side view of the road roller.

FIG. 1 and FIG. 2 illustrate a road roller 1 comprising a front carriage 2 and a rear carriage 3, which are interconnected by an articulated swivel joint 4 (FIG. 2). A front drum 5 is mounted on the front carriage 2 and a rear drum 6 is mounted on the rear carriage 3. The road roller is also equipped with a driver's cab 7 on the front carriage 2. The drums 5, 6 are each mounted on a pair of vertical supports 8, 9, which are each located on a pair of substantially horizontal load-bearing supports 10, 11. Also disposed on the load-bearing supports 10, 11 are eyes 34 for receiving crane hooks in case it is necessary to lift the road roller.

A water tank 12, a fuel tank 13, and similar elements are situated in the front carriage 2. A main drive 14 in the form of a diesel engine and auxiliary drives 15 are located in the rear carriage 3.

The front carriage 2 and the rear carriage 3 each have a supporting frame, the basic structure of which is indicated in FIG. 2 by a dashed line 17 and 18 respectively. The dashed lines 17 and 18 also indicate the directions of flow of forces between the articulated swivel joint 4 and the load-bearing supports 10, 11 on the front carriage 2 and the rear carriage 3 respectively. Accordingly, the directions of the force flowing from the articulated swivel joint 4 each run along a force line S1, S1 substantially horizontally in the longitudinal median plane 19 (FIG. 4) of the road roller 1 to a region G1, G2, where they divide into two ascending force lines S2, S2 that are oriented towards the front drum 5 and the rear drum 6 respectively, and terminate in two pairs of horizontal force lines S3, S3 above the drums 5, 6 in the lateral regions of the load-bearing supports 10, 11.

FIGS. 3 to 8 illustrate the supporting frame of the front carriage 2 (front carriage frame 16), which is similar to the supporting structure of the rear carriage 3. The statements regarding the front carriage frame 16 therefore also apply to the rear carriage frame, which is not illustrated in the figures for the sake of avoiding redundancy.

Figure 3:
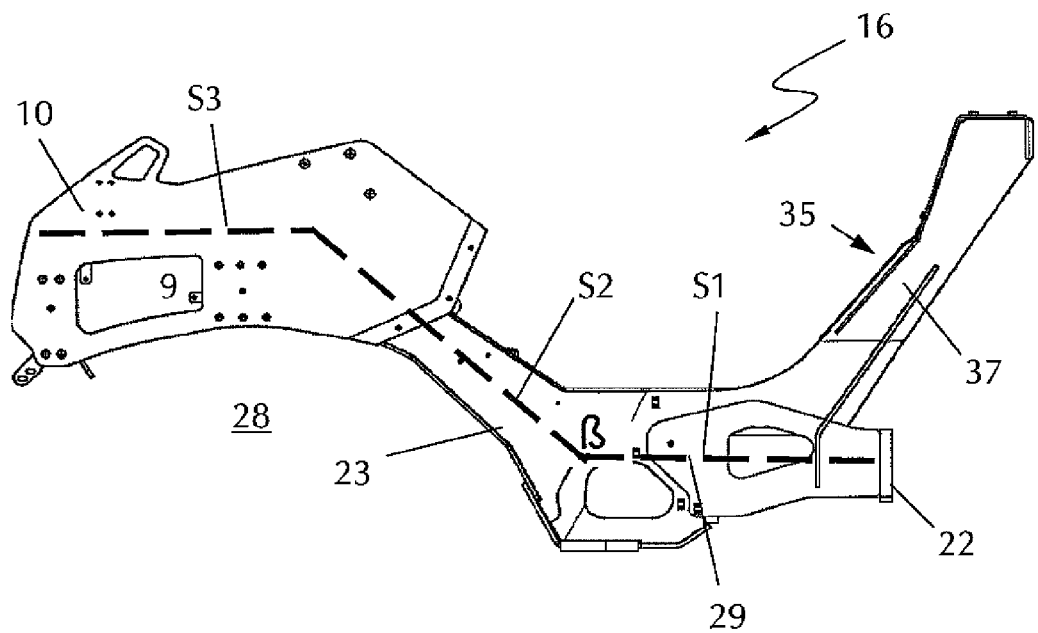
FIG. 3 is a side view of the front carriage frame of the road roller as shown in FIG. 1.
Figure 4:
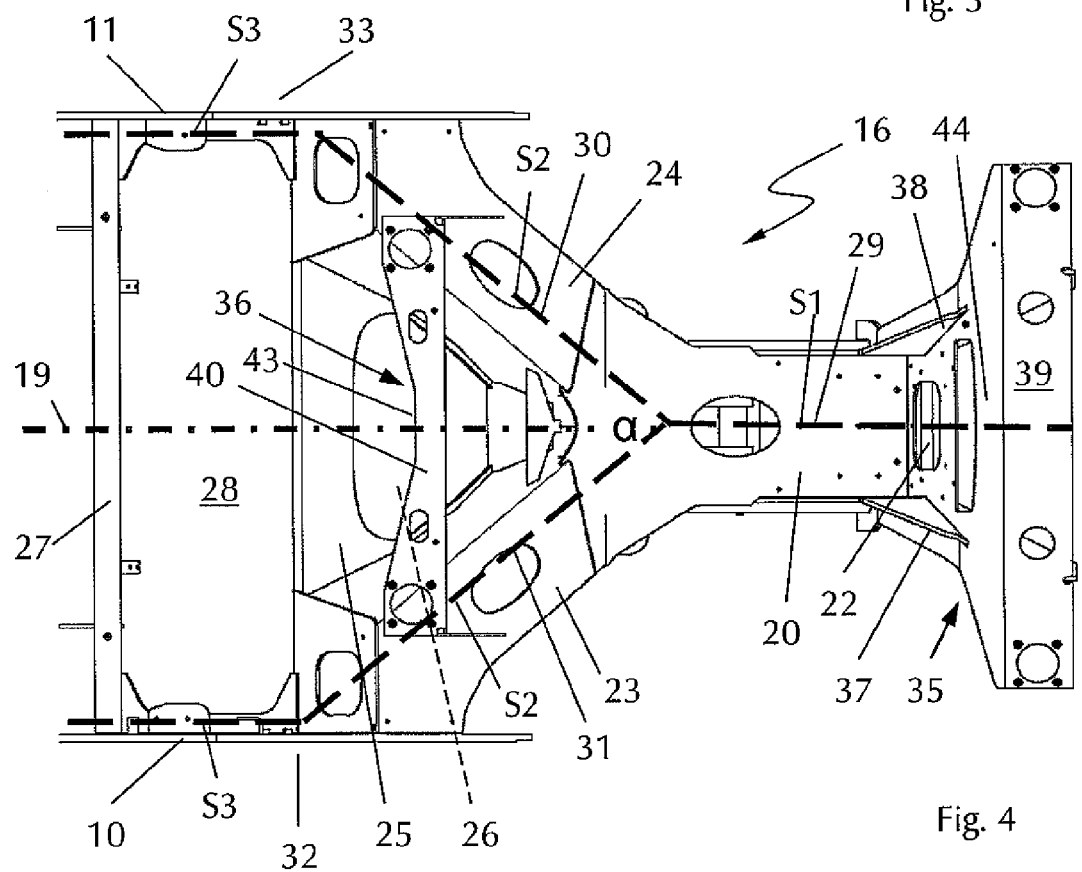
FIG. 4 is a top view of a front carriage frame of the road roller.

As shown in FIG. 3 and FIG. 4, in particular, the front carriage frame 16 is composed of beams. A main beam 20 runs horizontally in the longitudinal median plane 19 of the road roller 1. A vertical connecting plate 22 for the articulated swivel joint 4 is mounted on one end of the main beam 20. At the free end of the main beam, two side beams 23, 24 diverge from the main beam 20 to form a "V" in mirror-inverted relationship about the longitudinal median plane 19. The angle of spread α between the two side beams 23, 24 is an acute angle measuring approximately 45° in the exemplary embodiment illustrated. The main beam 20 and the side beams 23, 24 thus form a "Y". The triangular area between the two side beams 23, 24 is designated as an "interspace". The two side beams 23, 24 are further oriented upwardly at an obtuse angle β in relation to the main beam 20 and freely overhang the end of the main beam 20 in the forward direction, i.e., they are oriented away from the connecting plate 22.

At the end of each side beam 23, 24 there is disposed a horizontal load-bearing support 10 or 11 respectively. Said supports freely overhang the main beam 20 in a direction parallel to the main beam 20, and their free ends protrude beyond the free ends of the side beams 23, 24. Extending between the free ends of the two side beams 23, 24 in the connection region of the two load-bearing supports 10, 11, there is a connecting piece 25 for the purpose of providing rigidity, which in the example shown is in the form of a reinforcing metal plate, which fills the triangular space between the two side beams 23, 24 with the exception of an opening 26. A crossbeam 27 is also disposed between the free ends of the load-bearing supports 10, 11. The two side beams 23, 24 and the two load-bearing supports span a space 28 in which the front drum 5 is located.

The longitudinal median axis 29 of the main beam 20, the longitudinal median axes 30, 31 of the side beams 23, 24, and the longitudinal median axes 32, 33 of the load-bearing supports 10, 11 are indicated by dashed lines in FIGS. 3 and 4. They also diagrammatically indicate the lines of force flux S1, S2, and S3 in the corresponding components. In FIG. 4, it can be seen that the force flux runs from the outer load-bearing supports 10, 11 via the side beams 23, 24 from an outer region inwardly towards the center and thence proceeds along the main beam 20 to the connecting plate 22.

At that end of the main beam 20 that is near to the connecting plate 22, there is disposed a first base 35, which, together with a second base 36 that extends between the two side beams 23, 24, is used for mounting the driver's cab 7. The first base 35 is composed of two supporting beams 37, 38 and a first cross strut 39, which connects the two free ends of said supporting beams 37, 38 to each other.

Figure 5:
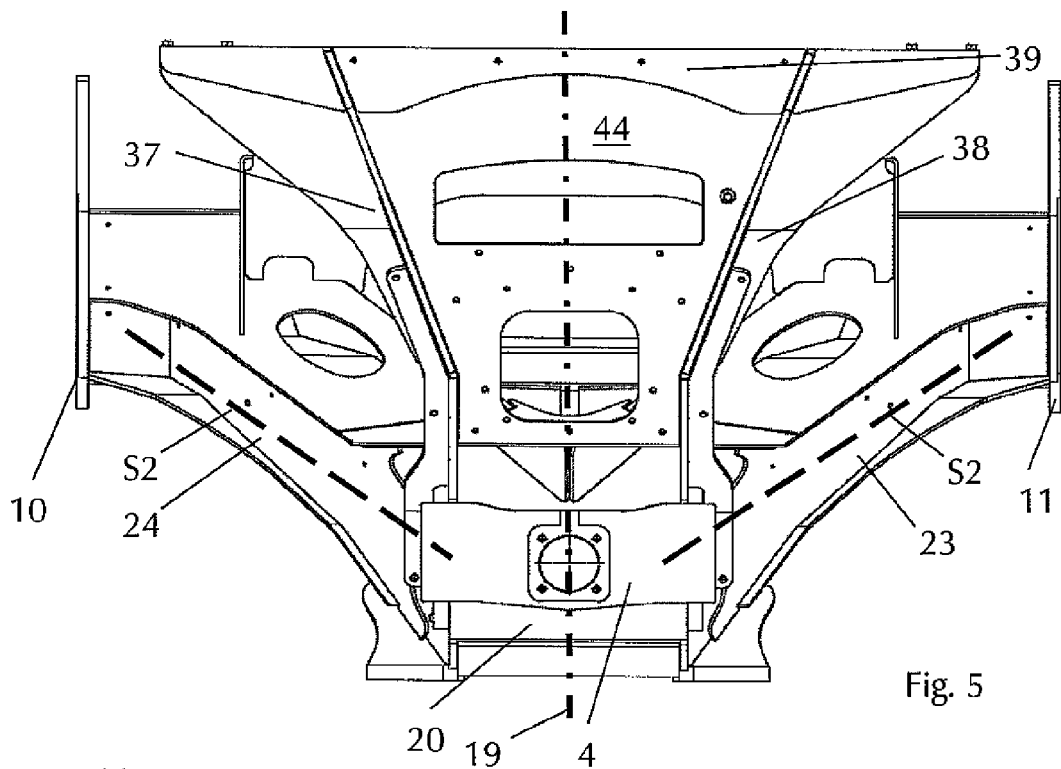
FIG. 5 is a rear view of the front carriage frame.
Figure 6:
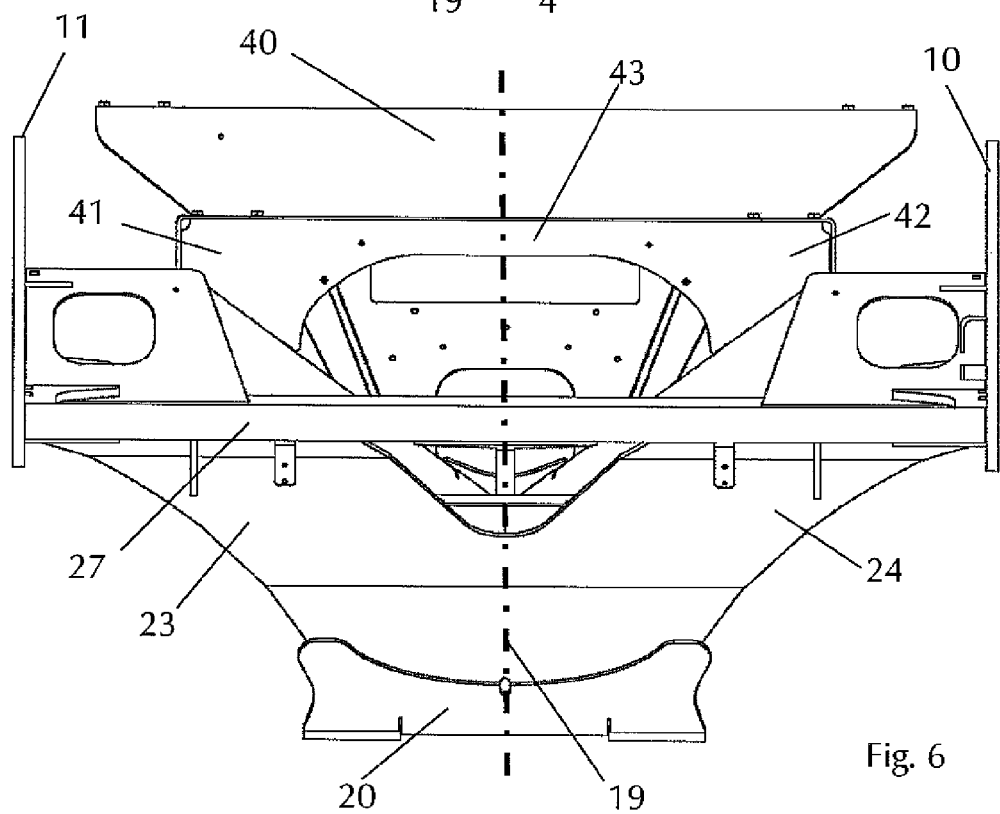
FIG. 6 is a front view of the front carriage frame.
Figure 7:
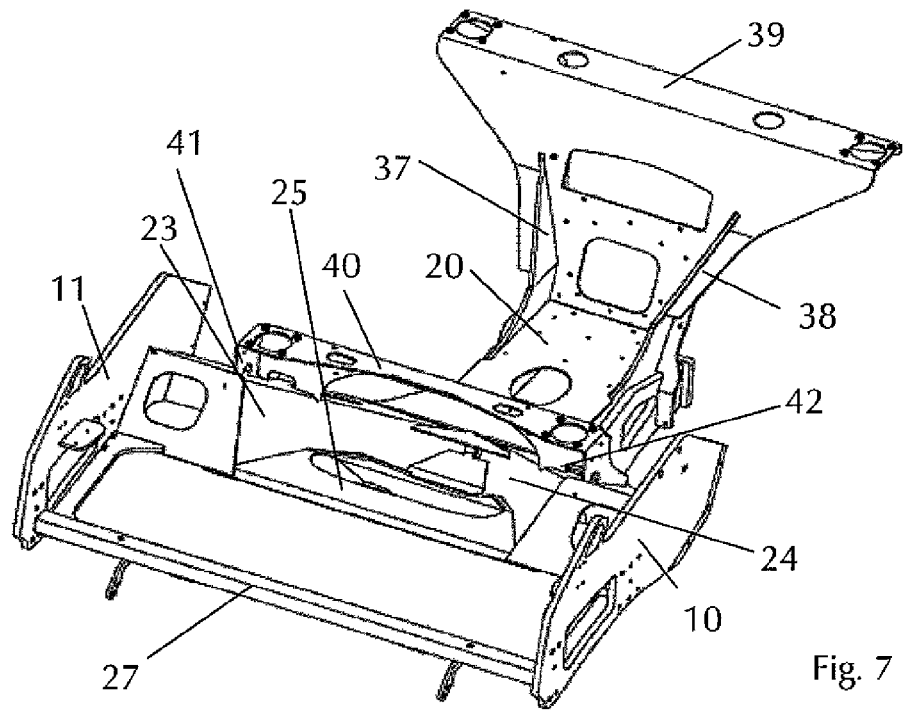
FIG. 7 is a perspective front view of the front carriage frame.
Figure 8:
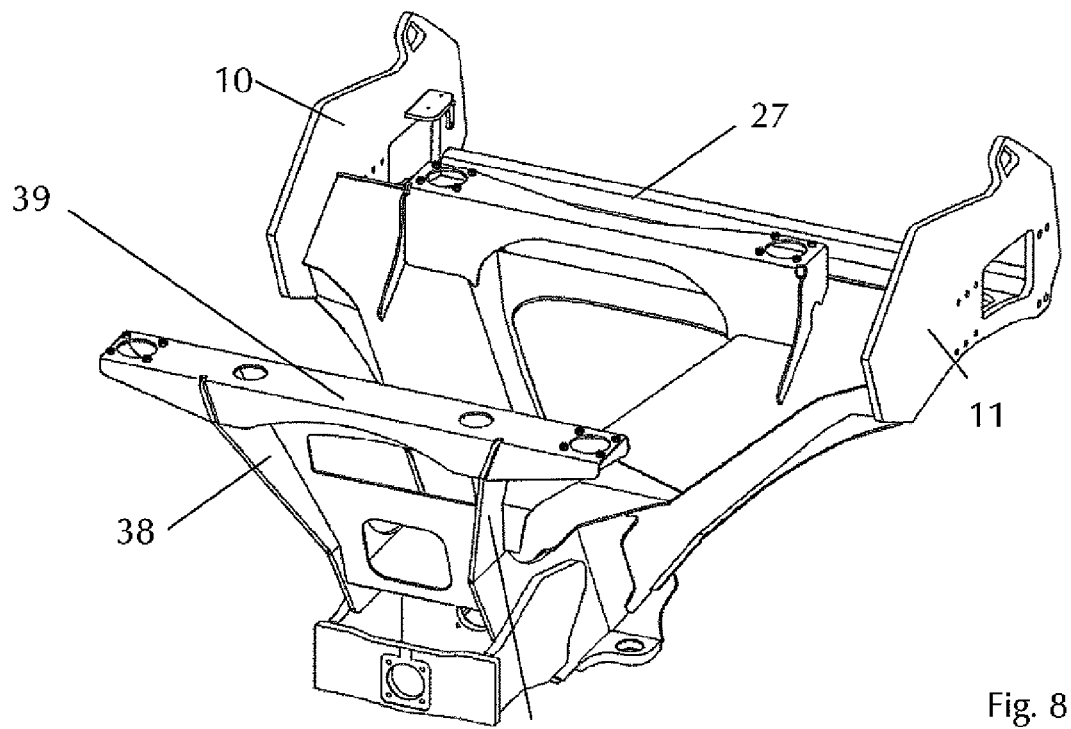
FIG. 8 is a perspective rear view of the front carriage frame.

As is also shown in FIGS. 5 and 6, both supporting beams 37, 38 as well as the two side beams 23, 24 diverge from the main beam 20 to form a "V" in mirror-inverted relationship about the longitudinal median plane 19 of the main beam 20 and also freely overhang the end of the main beam 20 and the connecting plate 22. Owing to the free overhang, the first base 35 is positioned above the articulated swivel joint 4. The stern edge of the driver's cab 7 also freely overhangs the free ends of the supporting beams 37, 38 towards the rear carriage 3 to such an extent that part of the rear carriage 3 is positioned beneath the stern region of the driver's cab 7.

The second base 36 is formed by two vertical driver's cab supports 41, 42 and a second cross strut 40, which extends between the two supports 41, 42 and is parallel to the first cross strut 39. The supports 41, 42 diverge from the side beams 23, 24 in the regions in which the ends of said side beams 23, 24 are connected to the horizontal load-bearing supports 10, 11. The driver's cab 7 is supported on the second cross strut 40 at its front region.

A stiffener made of a reinforcing metal plate 43 and 44 respectively, is mounted in the interspace between the supporting beams 37, 38 of the supporting beam pair described above and in the interspace between the driver's cab supports 41, 42. In the example illustrated, the free limb of the reinforcing metal plate 43 or 44 forms part of the cross strut 39 or 40. The free limb of the reinforcing metal plate 43 merges into an edge having an L profile, wherein the two legs of the "L" of the L profile form the first and second cross struts 39 and 40 respectively. In this context, the term "reinforcing metal plate" is understood to mean a steel plate having a thickness of several millimeters.

The main beam 20 and the side beams 23, 24 are in the form of tubular profiled elements. In the present exemplary embodiment, they are substantially shaped as a square tube. The supporting beams 37, 38 have a T profile.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A road roller having a front carriage and a rear carriage, which are interconnected by an articulated swivel joint, wherein the front carriage and the rear carriage have a front carriage frame and a rear carriage frame, wherein said front carriage frame and/or said rear carriage frame comprises a main beam extending horizontally in a longitudinal median plane of said road roller and at one end of which said articulated swivel joint is disposed, two side beams diverging from a free end of said main beam to form an upwardly oriented "V" in a mirror-inverted relationship about said longitudinal median plane, said side beams freely overhanging the free end of said main beam in such a manner that said side beams diverge from the main beam at an acute angle of spread α, the side beams together with the main beam thus forming a "Y" shape, and that the side beams are oriented upwards at an obtuse angle β in relation to the main beam, and load-bearing supports disposed at the free ends of said side beams in a direction parallel to said main beam which are configured for mounting a drum thereon.

2. The road roller according to claim 1, wherein at the end of said main beam of said front carriage of which said articulated swivel joint is disposed, upwardly oriented supporting beams forming a "V" in mirror-inverted relationship about said longitudinal median plane are disposed and configured for supporting a driver's cab.

3. The road roller according to claim 2, wherein a connector is disposed between the free ends of said side beams and/or between free ends of said supporting beams configured for supporting said driver's cab.

4. The road roller according to claim 2, wherein between the side beams a stiffener consisting of a reinforcing plate is disposed, which is located in an interspace between said side beams.

5. The road roller according to claim 2, wherein a respective transversal strut is disposed between the free ends of said side beams and/or between the free ends of said supporting beams.

6. The road roller according to claim 4, wherein said reinforcing plate forms part of a respective transversal strut between the free ends of said side beams and/or between the free ends of said supports.

7. The road roller according to claim 2, wherein vertical supports are disposed on said side beams of said front carriage and configured for supporting said driver's cab.

8. The road roller according to claim 7, wherein said main beam and said side beams are formed by a profile in the form of a hollow profile.

9. The road roller according to claim 7, wherein a water tank is disposed in a space above said main beam of said front carriage or of said rear carriage and also between the associated vertical supports configured for supporting said driver's cab and said side beams.

10. The road roller according to claim 1, wherein a fuel tank is disposed in a space between the free ends of said side beams of said front carriage or of said rear carriage.

11. The road roller according to claim 2, wherein between the supporting beams configured for supporting said driver's cab a stiffener consisting of a reinforcing plate is disposed, which is located in a region between said supporting beams.

12. The road roller according to claim 2, wherein between the side beams and between the supporting beams configured for supporting said driver's cab in each case a stiffener consisting of a reinforcing plate is disposed, which is respectively located in an interspace between said side beams and in a region between said supporting beams.

* * * * *